United States Patent [19]

Vallance

[11] Patent Number: 5,567,081
[45] Date of Patent: Oct. 22, 1996

[54] JOINT FORMING DEVICE

[75] Inventor: William E. T. Vallance, Marlow, England

[73] Assignee: Titus International Limited, Buckinghamshire, England

[21] Appl. No.: 359,461

[22] Filed: Dec. 20, 1994

[30] Foreign Application Priority Data

Dec. 23, 1993 [GB] United Kingdom ............... 9326352

[51] Int. Cl.⁶ .................................................. F16B 12/20
[52] U.S. Cl. ..................... 403/406.1; 403/405.1; 403/231
[58] Field of Search ............... 403/231, 405.1, 403/406.1, 407.1, 297, 292, 371

[56] References Cited

U.S. PATENT DOCUMENTS 5,238,343 8/1993 Scherrer ....................... 403/371 X

FOREIGN PATENT DOCUMENTS

| 2546749 | 4/1977 | Germany | 403/407.1 |
| 2748272 | 5/1979 | Germany | 403/231 |
| 2277973 | 11/1994 | United Kingdom | 403/406.1 |

*Primary Examiner*—Anthony Knight
*Attorney, Agent, or Firm*—Lowe, Price, LeBlanc & Becker

[57] ABSTRACT

A device for use in forming a joint includes a female part at least partially installed in a recess in one joint member and a male part adapted to be received in the female part. The male part is provided with an expander region having a plurality of taper portions for expanding the female part when the male part is moved axially relative to the female part such that an opposite end region of the male part moves away from the female part and thereby causes the female part to be secure in the recess. The female part includes a first end portion for insertion in the recess and a second end portion for insertion in a recess in another joint member and an abutment intermediate the end portions for limiting axial insertion of the second end portion into the recess.

45 Claims, 4 Drawing Sheets

JOINT FORMING DEVICE

The present invention relates to devices for use in forming a joint. The invention is particularly, though not exclusively, useful for forming a joint in knock-down furniture parts.

Home assembly or "knock-down" furniture is typically supplied to the customer in a 'flat pack' comprising a number of disassembled furniture parts and a package containing multiple-component securing devices for use in assembling the furniture, the furniture parts being provided with preformed recesses, bores and/or apertures for receiving the securing devices. Difficulty is often encountered in identifying which components of the joint forming devices should be fitted to the various recesses, bores, apertures etc. provided in the furniture parts and not only does this lead to customer frustration when assembling knock-down furniture, but also the incorrect fitting of components of the joint forming devices to the apertures etc. may cause damage to the apertures and/or to the components. It will also be appreciated that where the furniture to be assembled requires many joint forming device components such as the screw-threaded pin member 10 shown in FIG. 1 of the accompanying drawings, the screwing of these components into the respective furniture parts involves considerable labour for the assembler. A further problem that sometimes occurs is that an insufficient number of joint forming devices is provided in the 'flat pack'.

For the above and other reasons, manufacturers of knock-down furniture would prefer to pre-assemble the joint forming device components to the furniture parts before they are despatched from the factory, so that the consumer is required only to bring the furniture parts together and to engage and tighten the joint forming devices in order to assemble the furniture. However, as will now be described, some known joint forming devices are not entirely suitable for this purpose.

Figures 1, 2:
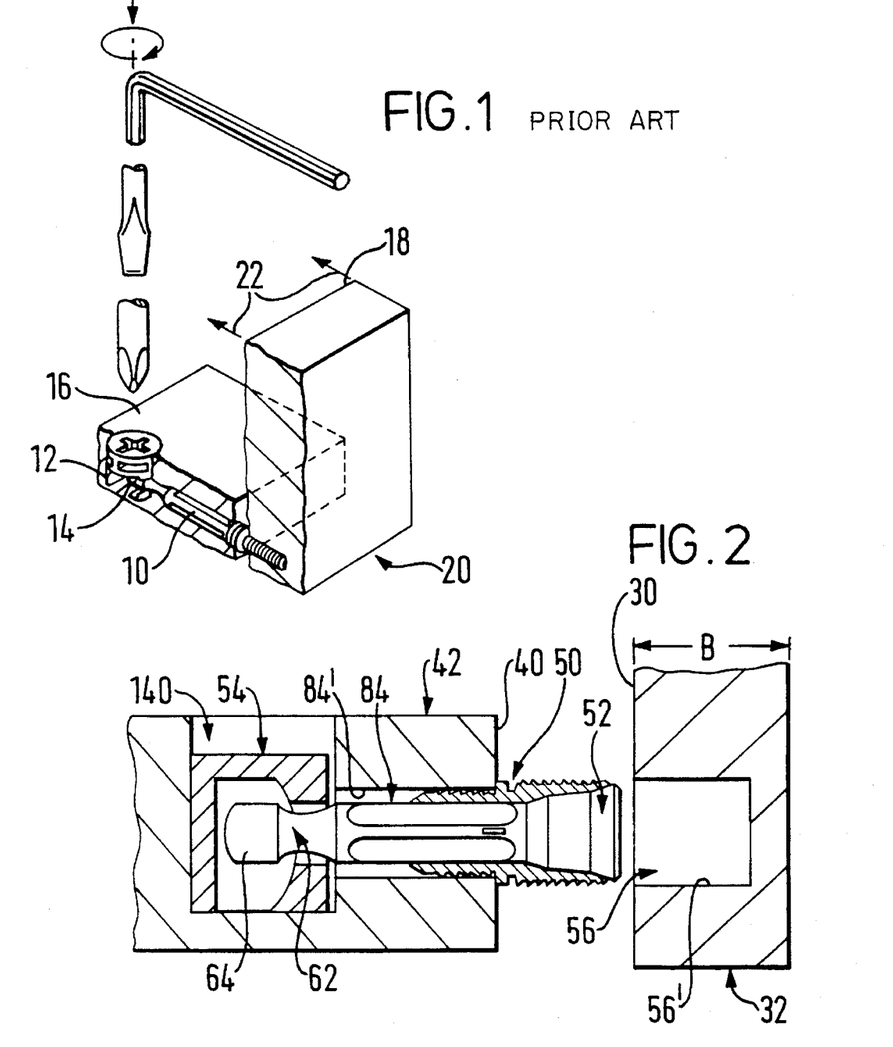
FIG. 1 shows a prior art securing device.
FIG. 2 is a sectional view of a first embodiment of a device for forming a joint.

FIG. 1 shows a known form of joint forming device which is commonly used for securing furniture parts in knock-down furniture. The device comprises a pin member 10 and a drum 12. The drum has a cam surface which engages the head 14 of the pin. The drum is designed to be received in a recess in one furniture part 16 and the pin member is designed to be screwed into a major surface 18 of a second furniture part 20 and, as indicated, rotation of the drum engaging the pin causes the two furniture parts to be drawn together as indicated by arrows 22.

It will be appreciated that if a joint forming device component such as pin member 10 is pre-assembled to a major surface of a furniture part as shown in FIG. 1, particularly where a number of such components project from that major surface and even more so if a number of furniture parts are each so-fitted with projecting securing device components, it then becomes difficult to 'flat pack' the furniture parts. A further problem arises in that movement of the panels relative to one another during transit may result in damage occurring to the furniture parts and particularly the major surfaces thereof if these come into contact with the projecting joint forming device components of other furniture parts.

GB 1573172 discloses a joint forming device to be pre-assembled with flat-pack furniture which appears to overcome at least some of the above-mentioned problems. The device comprises a pin member having a taper at one end thereof and a head to be cooperably engaged by a camming drum at the opposite end. A split dowel encases the pin member so that only the head protrudes therefrom and for transit purposes the dowel and pin member are held by the camming drum internally of a flat-pack furniture part. A complicated double camming action is required to first drive a portion of the pin member and dowel from the panel to be received in a recess in another panel and then expand the dowel to grip in that recess for securing the joint. This arrangement requires the use of a relatively large and complex camming drum.

An object of the present invention is to provide an improved joint forming device which at least partially overcomes some of the above-mentioned problems.

Accordingly, the invention provides a device for forming a joint, the device comprising a female part to be at least partially installed in a recess in one joint member, and a male part adapted to be push-fittable into said female part and having an end region comprising a plurality of taper portions for expanding the female part when said male part is moved axially relative to the female part such that an opposite end region thereof moves away from the female part whereby the female part is securable in said recess.

The mating region may have a profile corresponding to a profile of said male part expander region.

Preferably, the female part comprises means for facilitating expansion thereof.

Advantageously, the means for facilitating expansion comprises at least one longitudinally extending slit.

Preferably a rate of taper of at least one of said male part taper portions is linear.

The linear rate of the or each said linear taper portion may be such that a surface thereof is at an angle of twenty degrees to the male part central axis.

The expander region may comprise at least two axially spaced apart taper portions.

The at least two axially spaced apart taper portions may have the same rate of taper.

The expander region may comprise two axially spaced apart taper portions separated by a further taper portion having a rate of taper different to the rate of taper of either of said two taper portions.

The mating region may be disposed at one end of said through-passage.

The female part may comprise two generally cylindrical portions, a first of said portions to be installed in said recess and the second of said portions to be received in a bore in another joint member and having a smaller sectional area than said first portion.

Preferably, the or each slit is disposed in said first portion of the female part.

Advantageously, at least one further slit is disposed in said second portion of the female part.

The further slit may extend over the length of said second portion.

The or each slit may be axially aligned with a respective further slit.

Preferably, the or each slit is connected to its respective further slit by an internal groove.

The male part may comprise retention means so as to be retainable in said female part when push-fitted therein.

The male part may be axially push-fittable into said female part in one direction and the retention means may comprise at least one projection arranged to grip said female part so as to resist movement in the direction opposite said one direction.

The retention means may grip against a shoulder of a female part.

The or each projection may be arranged so as to be slidable in a respective said slit and groove associated therewith during push-fitting of the male part.

In semi-axial cross-section said expander region may have a profile comprising a plurality of axially spaced apart profiles.

The male part taper portions may be defined by respective adjacent turns of a continuous spiralling surface.

The female part may comprise a plurality of split ring means, each said split ring means defining a split, said split ring means being interconnected so as to be axially spaced apart and in substantially coaxial relationship with said splits in axial alignment for allowing transverse insertion of said expander region.

Each of the male part taper portions has a major diameter and the major diameter of each said male taper portion may be substantially the same.

The outside diameter of portions of the female part to be installed in said one joint member may be sized so as not to exceed 5.5 mm.

The female part may comprise externally disposed gripping means.

The gripping means may comprise a plurality of ribs which may be helical with respect to the female part central axis.

The device may further comprise on adjusting means to be installed in another joint member in operative relationship with the male part and being adapted for adjustably pulling on the male part in use of the device to cause said axial relative movement between said male and female parts.

The adjusting means may comprise cam means adapted to cooperably engage said male part.

The cam means may comprise a rotatable drum having at least one camming surface.

The rotatable drum may be disposed within a generally cylindrical housing.

The invention also provides a device for use in forming a joint comprising a female part and a male part insertable therein, said female part comprising a first end portion for axial insertion in a recess in one joint member, a second end portion for axial insertion in a recess in another joint member and an abutment means intermediate said end portions for limiting axial insertion of said second end portion into said recess in said another joint member, the male part being received in a through-passage of the female part which extends through said first and second portions and having a region cooperable with said first end portion such that on relative axial movement of said male part region towards said second end portion, said first end is caused to expand radially outwardly.

The abutment means may comprise an annular shoulder between said end parts.

The male part end region may comprise at least one taper portion.

In order that the invention may be well understood, an embodiment thereof, which is given by way of example only, will now be described with reference to the accompanying drawings, in which.

Referring to FIGS. 2 to 6, a device for use in forming a joint between a major surface 30 of a joint member 32 and an end/edge face 40 of another joint member 42 of an item of knock-down furniture comprises a female part or bush 50, a male part 52 and an adjusting means 54. In use, the male part 52 is axially push-fitted into female part 50 which is partially installed in joint member 42. The joint member 42 is assembled with joint member 32 such that the portion of female part 50 not installed in joint member 42 is installed in a recess 56 provided in joint member 32. The adjusting means 54 is installed in joint member 42 in operative relationship with the male part for adjustably pulling on the male part whereby the joint members can be secured together with an expander region 58 of the male part being pulled inwardly of the female part for expanding the female part such that the female part is adjustably securable in the recess 56.

The adjusting means comprises a cam means in the form of a rotatable drum 54 having camming surfaces 60 which are adapted to cooperably engage an end region 62 of the male part which is engageable therewith by insertion of head 64 into the drum via a gap 66 in the drum wall; subsequent rotation of the drum bringing the camming surfaces into engagement with the underside of head 64 for pulling the male part in the general direction (as indicated by arrow A in FIG. 2) of the drum central axis. The drum is provided with means for receiving a tool, such as a screwdriver or hexagonal wrench for example, by means of which it may be rotated (in the same way as the prior art device shown in FIG. 1).

Figure 5:
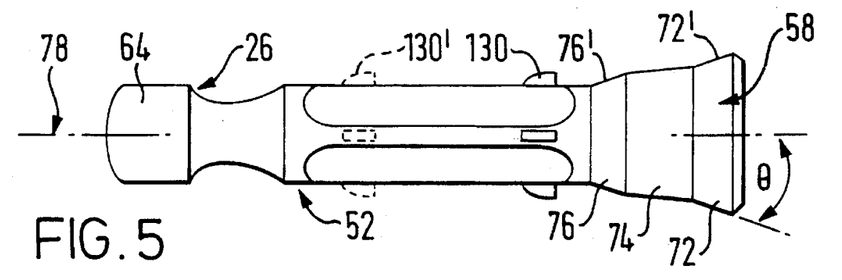
FIG. 5 shows a male part of the device shown in FIG. 2.
Figure 6:
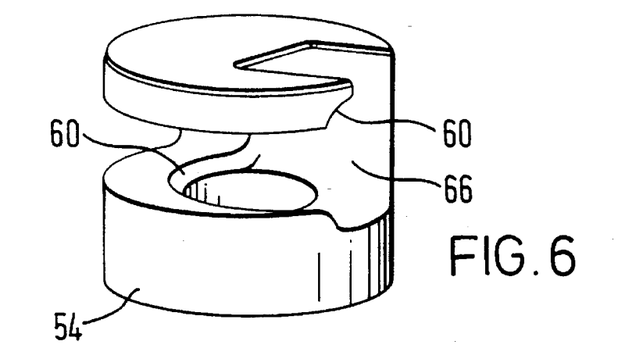
FIG. 6 is a perspective view of adjusting means of the device shown in FIG. 2.

As best seen in FIG. 5, the expander region 58 of the male part comprises a plurality of taper portions 72, 74, 76. Two of these taper portions—portions 72 and 76—have a rate of taper such that a respective surface 72', 76' of the portions is at an angle θ of twenty degrees to the male part central axis 78. The two taper portions 72, 76 are axially spaced apart and separated by taper portion 74 which has a rate of taper different to that of portions 72, 76.

Figure 3:
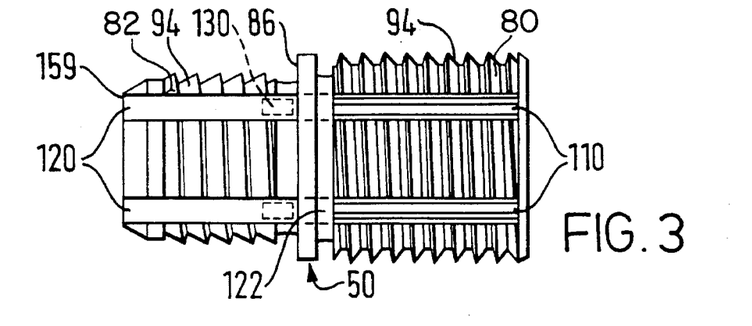
FIG. 3 shows a female part of the device shown in FIG. 2.
Figure 4:
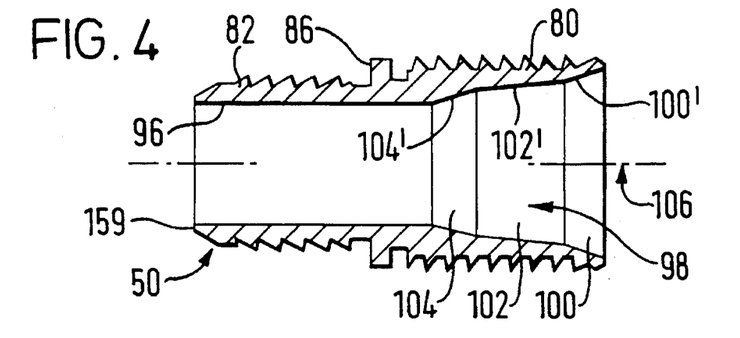
FIG. 4 is a sectional view of the female part.

The female part 50 comprises two generally cylindrical portions: a first portion 80 to be installed in recess 56 and a second portion 82 to be received in a bore 84 of joint member 42. Second portion 82 has a smaller sectional area than first portion 80 and an annular shoulder 86 is defined at the intersection of the two portions. The female part is provided with externally disposed gripping means in the form of helical circumferential ribs 94 for gripping respective walls 56' and 84' of the recess 56 and bore 84. It will be appreciated that the helical form of ribs 94 allows the female part to be more readily withdrawn from recess 56 and bore 84 during dismantling of the joint reducing the likelihood of damage to the female part so that the device is reusable and may be used to form several joints.

A centrally disposed through-passage 96 is provided in the female part for receiving the male part 52. The through-passage 96 has a mating region 98 disposed at one end thereof and comprises a plurality of taper portions 100, 102, 104 arranged to cooperably receive the male part taper portions 72, 74, 76 when the male part has been push-fitted into the female part. In the embodiment, the respective taper portions of the male and female parts are formed such that the profile of expander region 58 corresponds to the profile of the mating region 98. Thus taper portions 100 and 104 have respective surfaces 102', 104' at an angle of twenty degrees to the female part central axis 106 and the taper portion 102 has a rate of taper different to that of portions 100, 104 but corresponding to that of male part taper portion 74.

It is to be understood that the correspondence of the profiles is not a strict requirement and that some differences may be introduced to increase the interference as the expander region 58 is drawn axially inwardly of the female part for providing desired tightening/expansion characteristics.

As shown in FIG. 3, the first portion 80 of the female part is provided with means for facilitating expansion thereof in the form of circumferentially spaced apart slits 110 which extend in the longitudinal direction of the female part. The second portion 82 is also provided with longitudinally extending slits 120 which are the same in number and are axially aligned with the slits 110. The slits 110 extend over a part of the length of first portion 80, whereas the slits 120 extend over the whole length of portion 82. A respective internal groove 122 connects the respective pairs of axially aligned slits 110, 120 to allow sliding receipt of male part retention means 130 (to be described in greater detail below). For the avoidance of doubt, it is to be understood that the slits 110, 120 and grooves 122 have been omitted from FIG. 4 to improve the clarity thereof.

The provision of slits 120 increases the flexibility of second portion 82 which serves to make easier its installation in bore 84. By making the section area of bore 84 slightly smaller than that of portion 82 an interference fit is obtainable with the slits 120 allowing portion 82 to be deformed so as to grip bore wall 84' and the male part.

The male part retention means 130 are provided so that the male part is retainable in its push-fitted position in the female part. The retention means comprises projections 130 disposed at circumferentially spaced apart locations intermediate the end region 62 and the expander region 58. The number of projections 130 and circumferential spacing thereof is selected such that the projections may slide in the slits 110 and grooves 122 when the male part is being axially push-fitted into the female part. The spacing of the projections from the free end of the expander region 58 is such that when the male part is in its fully inserted position, as shown in FIG. 2, the projections are received in the slits 120 and engage behind shoulder 86 so as to resist movement of the male part in the direction opposite to the direction of push-fitting. The engagement of the projections is not shown in FIG. 2, but a projection shown in its engaged condition is indicated by phantom lines in FIG. 3.

In use, the drum 54 is installed in a recess 140 which has a central axis substantially perpendicular to the axis of bore 84 and the drum gap 66 is aligned with bore 84 for receiving the male part head 64. The male part is push-fitted into the female part so as to be retained therein with the projections 130 engaged behind shoulder 86. Thus joined, the male and female parts are axially inserted into the joint member 42 with the female part second portion installed in bore 84 and the male part head 64 inserted in drum 54 (as shown in FIG. 2). It will be appreciated that with the female part second portion 82 gripping the wall of bore 84 by means of the ribs 94 and the male part being retained in the female part by the projections 130, the device parts 50, 52 and 54 are retainably installed in joint member 42. Thus, during transit as part of a flat-pack of knock-down furniture the device will not be dislodged from joint member 42 by vibration or rough handling.

It is to be understood that the order of fitting of the male and female parts to joint member 42 is not critical. The male and female parts may alternatively be fitted to joint member 42 by first installing the female part second portion 82 in the bore and then inserting the male part so that the head 64 thereof is received in the drum and the projections 130 engage shoulder 86 as previously described.

With the parts installed in this manner, the device is pre-assembled with joint member 42 ready for flat-packing. An assembler having unpacked joint members 32 and 42 from a flat-pack may form a joint between the two members simply by placing them in abutting relationship such that the female part first portion 80 is installed in recess 56 of joint member 32 and rotating the drum to tighten the joint. The camming surfaces 60 are formed such that rotation of the drum causes them to cooperably engage the underside of the male part head portion 64 and pull the male part towards the central axis of the drum. This causes the male part expander region 58 to be drawn inwardly of the female part whereby the taper portions 72, 74, 76 act on the respective taper portions 100, 102, 104 of mating region 98 to expand the female part first portion 80 so that the ribs 94 firmly grip the wall of recess 56. With the female part firmly gripping the joint member 32 in this way, continued rotation of the drum will pull the joint members tightly together thereby securing the joint. During this operation, it is the abutment of shoulder 86 and joint member end face 40 which prevents movement of the female part with the male part to provide a relative movement between the two parts such that the expander region 58 is drawn into the mating region. The assembler has merely to hold or lightly clamp the members together during the tightening process.

The provision of a multi-tapered expander portion is believed to provide an improved expansion characteristic as compared with a single taper such that the female part first portion is expanded over a greater part of its length to provide a better grip in recess 56. It will be understood that the respective taper portions acting against each other each provide expansion of the female member at axially spaced positions so that expansion is not concentrated at the free end of the mating portion as tends to be the case when a single taper portion is used.

The multi-tapered expander portion also provides a stop facility which can reduce likelihood of damage to the female part by over-tightening of the joint. If the expander region is drawn inwardly of the mating region beyond a predetermined point, taper portions having a markedly different rate of taper may act against each other. Thus in the embodiment, after a certain degree of relative axial movement between the male and female part, taper portion 72 will be pulled against mating region taper portion 102 which will increase the resistance to turning of the drum. Thus by suitable selection of the male and mating region profiles, the assembler can be provided with an indication that the joint is sufficiently tight before the female part suffers permanent deformation damage.

It will be appreciated that the abutment of shoulder 86 with the end face 40 and/or an interference fit between the second portion 82 of the female part and bore 84 serves to ensure the joint is formed with substantially no gap being left between the joint members. This problem may particularly arise where the male part does not comprise retention means such as the projections 130 or, where the effectiveness of the retention means is reduced due to manufacturing tolerances. The forming of joints with such a gap may arise where the recess 56 is not sufficiently large to receive the female part first portion 80 such that on pushing together of the joint members the male part is moved relative to the female part and abuts the base of recess 56 before the first portion 80 is fully received in the recess. In this condition, if the drum 64 were operated to move the male part axially inwardly of the female part to expand the first portion 80, the joint is tightly formed with the gap between the members retained. The shoulder 86 or above-mentioned interference fit provides a resistance such that when the male part abuts the base of the recess, further pressing together of the joint members forces the first portion fully into the recess with relative movement between the male and female parts so that the male part is returned to a position relative to the female part in which operation of the drum will tighten the joint with substantially no gap between the joint members.

Although it is stressed that use of the device is not limited to pre-assembly with knock-down furniture for flat-packing—it may instead be supplied in kit form together with the joint members to be assembled on site—it will be appreciated that it is particularly suitable for flat-packing purposes. As shown in FIG. 2, the device components are pre-assembled with a joint member 42 so as to be installed generally internally thereof. Substantially no portion of the device protrudes from a major surface of the joint member, so that many joint members may be readily flat-packed with their major surfaces in abutting relationship. Such portions of the devices as do protrude from the joint member do so from an edge or end surface of the member and will not therefore be directed toward the major surfaces of other joint members in the flat-pack.

It will be further appreciated that the device can provide a particularly compact means for forming a joint between the joint members and may for example be sized for use in connection with members having a thickness dimension B (FIG. 2) of as little as 15 mm.

Figure 7:
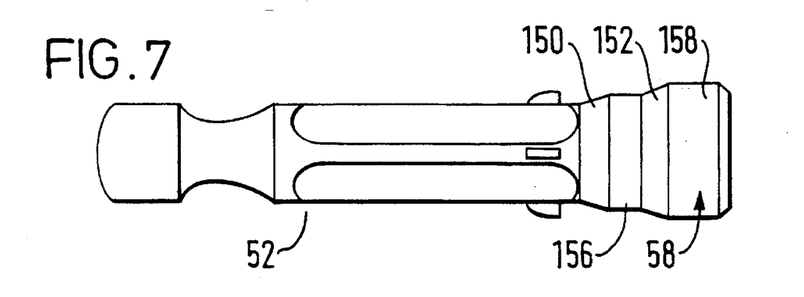
FIG. 7 shows an alternative male part for use in the first embodiment.

It will be understood that the configuration of the expander region 58 and mating region 98 shown in the embodiment may be varied. For example, the taper portions 72 and 76 of the male part might be separated by a parallel sided cylindrical portion rather than a further taper portion and the respective portion 102 of the mating region may be adjusted accordingly. Alternatively, the arrangement shown in FIG. 7 could be used. In this case the male part expander region 58 has taper portions 150, 152 separated by a parallel sided cylindrical portion 156 with taper portion 152 being separated from the free end of the expander region 58 by a further cylindrical portion 158. In semi-axial cross-section the expander region has a profile comprising a plurality of axially spaced apart tapers. With the taper portions disposed away from the end of the male part in this way and by similarly positioning the respective taper portions of the female part away from the free end of its first portion 80, the expansion of the female part may be constrained to occur at the upper end of recess 56.

It will be readily appreciated that the means for facilitating expansion of the female part need not necessarily comprise slits in the female part walls. Instead areas of the female part may be selectively thinned. In the case where slits are not provided, the projections 130' (shown by phantom lines in FIG. 5) may be disposed so as to be engageable with a free end face 159 of the second portion 82 of the female part.

It will be understood that the female part may include a longitudinal slot via which the male part can be transversely inserted by snap-fitting rather than axial push-fitting insertion. Alternatively, the female part can comprise two portions optionally joined by hinge means which are snap-fittable together around the male part.

It is also to be understood that the female part does not necessarily require a second portion 82. For example, a single portion female part may be used which comprises all of the features of the FIG. 3 part except for portion 82 such that shoulder 86 forms an end of the part. In this case, the retention means of the male part would engage shoulder 86 of the female part. However, with such a female part, retention of the male part and female part in joint member 42 relies upon engagement of the camming surfaces 60 with the male part end region 62.

Figure 8:
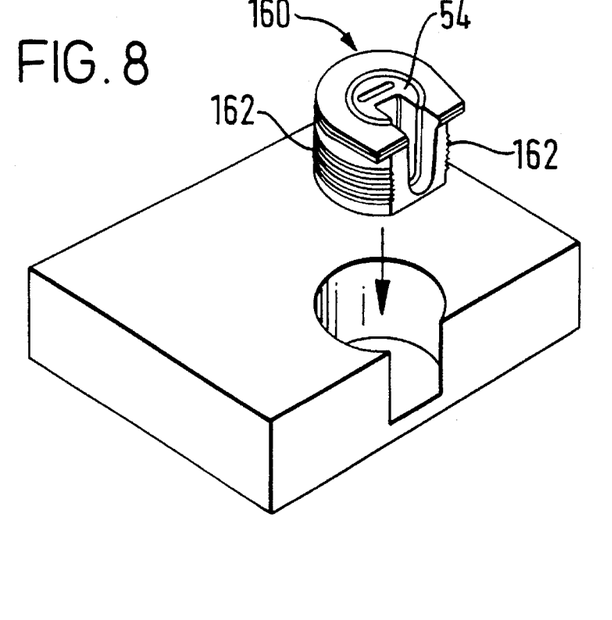
FIG. 8 shows an alternative adjustor means for a joint securing device of the type depicted in FIG. 2.

As an alternative to installing the rotatable drum 54 directly in a recess 140, the drum can be installed in a generally cylindrical body member 160 as shown in FIG. 8. The body member is provided with a plurality of circumferential ribs 162 whereby the body member can be fixed in a recess in a joint member by push-fitting therein. Although this arrangement could be used with a female part 50, it is envisaged that it would be particularly suited for use with a female part not having a second portion 82.

Two further embodiments of the joint forming device will now be described with reference to FIGS. 9 to 14. These further embodiments have an advantage over the previously described embodiment in that either can be so as to readily be substituted for prior art devices of the type shown in FIG. 1 in which the male part is screwed into a joint member.

Typically, the threaded end of a male part such as that shown in FIG. 1 is to be screwed into a 5 mm recess. It will be understood that if the female part of the previously described embodiments were sized to fit into a 5 mm recess, the male part would have to much thinner than 5 mm and this would lead to a considerable reduction in the strength of the joint forming device. This reduction in strength would for most uses be unacceptable, particularly if the male part is to be made of a die casting alloy (such as zinc) or a plastics material. The joint forming devices shown in FIGS. 9 to 14 can be sized such that the female part can be fitted into a 5 mm recess whilst the male part head and central regions can be maintained in the same, or similar, proportions as the previously described embodiment or the FIG. 1 type device.

Figure 9:
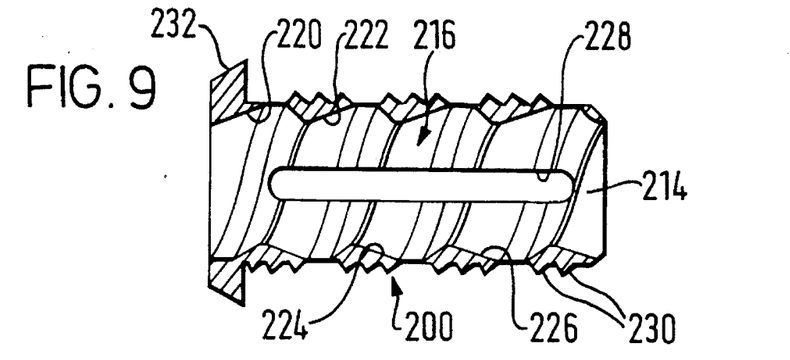
FIG. 9 shows a female part of a second embodiment of a device for forming a joint.
Figure 10:
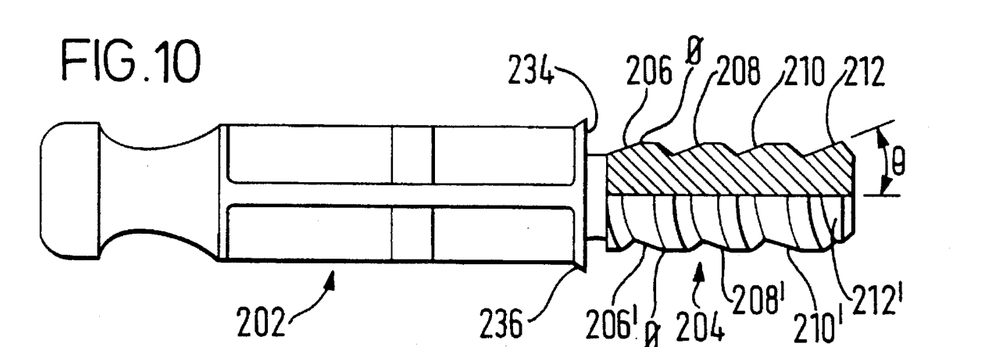
FIG. 10 shows a male part for use with the female part shown in FIG. 9 with an expander region thereof in semi-axial cross-section.

FIGS. 9 and 10 show a second embodiment of a joint forming device comprising a female part 200 and a male part 202 having an expander region 204 adapted to be received in the female part. The expander region 204 comprises a plurality of taper portions 206, 208, 210 and 212. Each of these taper portions has a rate of taper such that a respective surface 206', 208', 210' and 212' thereof is at an angle θ of twenty degrees to the male part central axis. In semi-axial cross-section the expander region has a profile comprising a plurality of axially spaced apart tapers.

The female part 200 has a through-passage 214 for receiving the male part and in particular the expander region 204. The through-passage 214 has a mating region 216 which comprises a plurality of taper portions 220, 222, 224 and 226 which are arranged to cooperably receive the male part expander region 204. The female part is provided with means for facilitating the expansion thereof in the form of a plurality of circumferentially spaced longitudinally extending slits 228.

The respective taper portions of the male and female parts are configured such that the profile of the expander region 204 corresponds substantially to the profile of the mating region 216. The male part taper portions 206, 208, 210 and 212 are defined by respective adjacent turns of a continuous spiralling surface. The taper portions of the female part are likewise configured to define a continuous spiralling surface. Preferably, the spiral taper portions extend helically around their respective regions 204, 216. It will be understood that the respective continuous spiralling surfaces of the regions 204, 216 cooperate to allow insertion of the expander region into the female part by means of a relative rotation between the male and female parts 202, 200.

The female part 200 is provided with external gripping means in the form of helical circumferential ribs 230 for gripping a wall of the recess in which the part is installed. A tapered flange 232 is provided at one end of the female part for abutting an end face 234 of the male part central region prior to tightening of a joint. The flange is to be received in a bore in a joint member in which the male part head and central regions is to be installed. It will be appreciated that the taper of the flange 232 and of a mating flange 236 on the male part allows relative movement to occur between the two parts during tightening of the joint whilst at the same time abutment of the respective flanges 232, 236 with a wall of the bore limits axial movement of each part.

A joint forming device comprising the male and female parts 202, 200 can be used to form a joint and pre-assembled to panels to be 'flat packed' in the same way as the previously described embodiment when not provided with a second portion 82; that is it functions in a generally similar manner. However, retention means are not considered necessary, since the engagement between the expander and mating regions is envisaged as being sufficient to present a pre-assembled male and female part 202, 200 separating in transit.

It will be understood that the male and female parts of the second embodiment can readily be sized such that the female part is fittable into a 5 mm diameter recess without it being necessary to reduce the size of the male part head and central regions in proportion. Therefore users of the FIG. 1 type prior art devices, such as manufacturers of 'flat pack' furniture, can use a device according to the invention without altering an existing drilling set-up or changing the part materials to avoid a sacrifice in joint strength.

FIGS. 11 to 14 show a third embodiment of a joint forming device comprising a female part 250 and a male part 252 having an expander region 254 adapted to be received in the female part. The expander region comprises a plurality of taper portions 256, 258, 260 and 262. As with the previously described embodiments, the taper portions 256 to 262 each have a rate of taper such that their respective surfaces 256', 258', 260' and 262' are at an angle θ of twenty degrees to the male part central axis. In semi-axial cross-section the expander region has a profile comprising a plurality of axially spaced apart taper portions.

Figure 11:
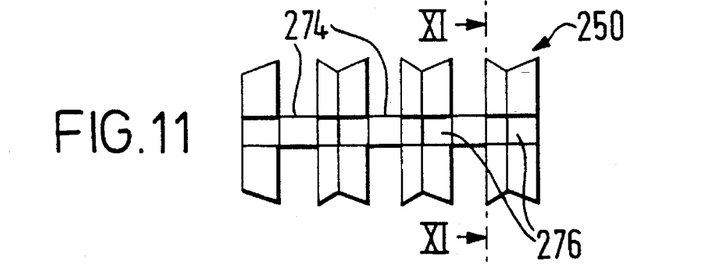
FIG. 11 is a side view of a female part of a third embodiment of a device for forming a joint.
Figure 12:
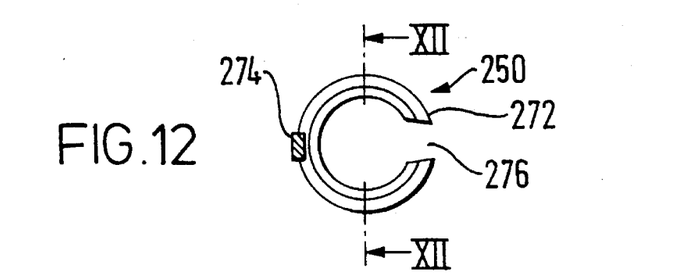
FIG. 12 is a sectional view on line XI—XI in FIG. 11.
Figure 13:
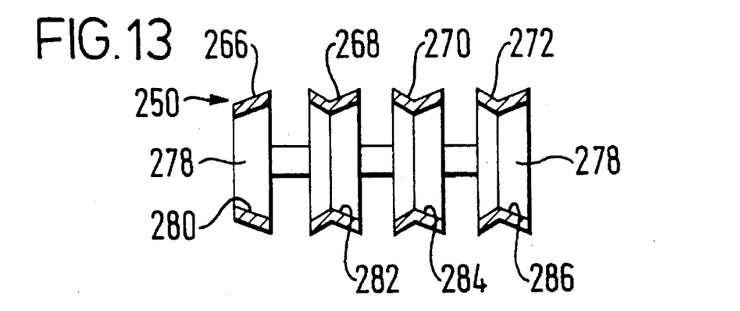
FIG. 13 is a sectional view on line XII—XII in FIG. 12.
Figure 14:
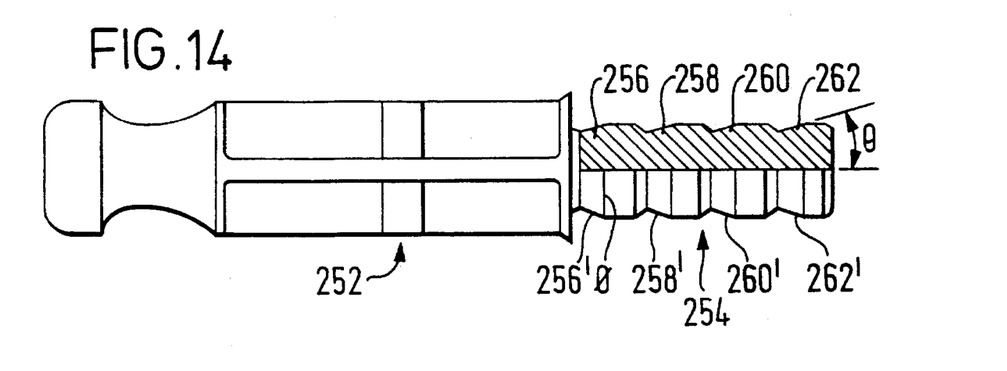
FIG. 14 shows a male part for use with the female part of FIG. 11 with an expander region thereof in semi-axial cross-section.

The female part comprises a plurality of split rings or collars 266, 268, 270 and 272. Each collar is connected at a position on the periphery thereof with an adjacent collar or collars by a respective connecting strip 274. The collars are each provided with a split 276 extending in the axial direction of the female part and disposed in diametrically opposite relation to the connecting strips 274. The interconnected collars are axially spaced apart and in substantially coaxial relationship to define a through-passage 278 which has a mating region comprising a plurality of taper portions 280, 282, 284 and 286. The respective taper portions of the male and female parts are configured such that the profile of the mating region 278 corresponds substantially to the profile of the expander region 254.

The peripheral surface of each collar 274 is configured to provide a gripping means for gripping a wall of the recess in which the female part 250 is installed.

The splits 276 are axially aligned such that, in use, the male part expander region 254 can be transversely inserted to a received position in the female part via the splits 276. It will be understood that the female part is to be made of a material which in combination with the configuration thereof provides sufficient flexibility to allow insertion of the male part.

In forming a joint and being pre-assembled to panels to be 'flat packed' a joint forming device comprising the male and female parts 252, 250 is used in the same way as the second embodiment. It will be appreciated that separate retention means are not required in this embodiment since the male is snap-fitted into the female part.

It will be appreciated that in the second and third embodiments, the major diameter Ø of each male part taper portion is substantially the same.

As described above, the female part of the second and third embodiments can readily be sized to be installed in a 5 mm recess. Typically, those portions of the female part to be installed in a 5 mm recess would have a width or diameter slightly in excess of 5 mm to provide a degree of interference. The gripping means provided on the female parts can be configured to act as so-called size modifiers. That is the gripping means provides a degree of flexibility in the effective width of the female part to allow for variations in the size of a nominal 5 mm recess. Preferably the width of the portions of the female part to be installed in a 5 mm recess would not exceed 5.5 mm. It will be understood that the gripping means of the first embodiment can likewise be configured to act as size-modifiers.

The head of the male part 52, 202 or 252 and the drum may be provided with respective sets of cooperably engageable protrusions or depressions as disclosed in the applicant's United Kingdom patent number GB2246826B. Such an arrangement provides a plurality of locked positions of the drum and male part and would be particularly applicable where the one portion female part is used since with the drum and male part engaged in one of the locked positions the male part would be securely retained for transit purposes. Additionally, such an arrangement provides for greater security of the joint when formed.

It is to be understood that the adjusting means is not limited to a rotary cam means but may in one alternative comprise a linear cam which is actuable against the male part with a wedging action by adjustable movement in directions intersecting the longitudinal axis of the dowel-pin. It is also envisaged that a rack and pinion type adjustor would be applicable to the device.

It is envisaged that generally the female part would be manufactured as a one piece plastics moulding whilst the adjusting means and male part could be manufactured by die casting in a suitable zinc or aluminium based die casting alloy. However, the above-described examples of materials and manufacturing method are not to be taken as limiting. For example, particularly for heavy duty purposes, a die cast Zinc female part may be utilised. In the case of the male part 252 it will be understood that a greater degree of flexibility is required to allow snap-fitting insertion of the male part. Although such a male part could be formed as a plastics moulding, it is envisaged that it could be resilient metal pressing, steel being considered a suitable material.

A further feature of the device is that the loads applied to the male part in use of the device act in the axial direction thereof. It is therefore believed that the male part may advantageously be formed of a plastics material. It will of course be understood with reference to the prior art device shown in FIG. 1 that plastics materials are not particularly suitable where the male part comprises a threaded portion which must cut into the material of the respective joint member and is therefore subjected to non-axial loads.

It is to be understood that whilst the embodiments have been described in connection with forming a joint between an end/edge surface of one joint member and a major surface of another joint member, that where required, the device is equally suited to forming end/edge surface to end/edge surface joints. Furthermore, the device is not limited merely to use with knock-down furniture and may be used for forming a joint between a joint member and a wall or other structural element whereby an object comprising the joint member would be fixed to the wall or other structural element.

Many modifications and variations of the apparatus will be readily apparent to those skilled in the art which may be deemed to fall within the scope of the invention as set forth in the appended claims.

I claim:

1. A device for use in forming a joint, the device comprising:
    a female part to be at least partially installed in a recess in one joint member, said female part defining a centrally disposed through-passage;
    a male part having a first end portion and a second end portion, said first end portion having an expander region adapted to be received in said through-passage; and
    adjusting means to be installed in another joint member in operative relationship with the male part second end portion and being adapted for adjustably pulling on the male part in use of the device to cause relative axial movement between said male and female parts, said expander region comprising a plurality of taper portions for expanding the female part when said male part is pulled by said adjusting means such that said second end portion moves away from the female part whereby the female part is securable in said recess and said through passage being provided with a mating region comprising a plurality of taper portions arranged to cooperate with said male part taper portions.

2. A device as claimed in claim 1, wherein said mating region has a profile corresponding to a profile of said male part expander region.

3. A device as claimed in claim 1, wherein said female part comprises means for facilitating expansion thereof.

4. A device as claimed in claim 3, wherein said means for facilitating expansion comprises at least one longitudinally extending slit.

5. A device as claimed in claim 4, wherein said female part has a leading end which, in use, is installed first in said recess and the or each slit has a first end which is spaced apart from said leading end and extends from said first end away from said leading end.

6. A device as claimed in claim 1, wherein a rate of taper of at least one of said male part taper portions is linear.

7. A device as claimed in claim 6, wherein the rate of taper of the or each said linear taper portion is such that a surface thereof is at an angle of twenty degrees to the male part central axis.

8. A device as claimed in claim 1, wherein said expander region comprises at least two axially spaced apart taper portions.

9. A device as claimed in claim 8, wherein said at least two taper portions have the same rate of taper.

10. A device as claimed in claim 8, comprising two axially spaced apart taper portions which are separated by a further taper portion having a rate of taper different to the rate of taper of either of said two taper portions.

11. A device as claimed in claim 1, wherein said mating region is disposed at one end of said through-passage.

12. A device as claimed in claim 1, wherein said female part comprises externally disposed gripping means.

13. A device as claimed in claim 12, wherein said gripping means comprises a plurality of ribs.

14. A device as claimed in claim 13, wherein said ribs are helical with respect to the female part central axis.

15. A device as claimed in claim 1, wherein said adjusting means comprises cam means adapted to cooperably engage said male part.

16. A device as claimed in claim 15, wherein said cam means comprises a rotatable drum having at least one camming surface.

17. A device as claimed in claim 16, wherein said rotatable drum is disposed within a generally cylindrical housing.

18. A device for use in forming a joint comprising a female part and a male part insertable therein, said female part comprising a first end portion for axial insertion in a recess in one joint member, a second end portion for axial insertion in a recess in another joint member and an abutment means intermediate said end portions for limiting axial insertion of said second end portion into said recess in said another joint member, the male part being received in a through-passage of the female part which extends through said first and second portions and having a region cooperable with said first end portion such that on relative axial movement of said male part region towards said second end portion, said first end portion is caused to expand radially outwardly.

19. A device as claimed in claim 18, wherein said abutment means comprises an annular shoulder between said end portions.

20. A device as claimed in claim 18, wherein said male part region comprises at least one taper portion.

21. A device for use in forming a joint, the device comprising:
    a female part to be at least partially installed in a recess in one joint member, said female part comprising (i) two generally cylindrical portions defining a centrally disposed through-passage, a first of said portions to be installed in said recess and the second of said portions to be received in a bore in another joint member and having a smaller sectional area than said first portion, and (ii) expansion facilitating means comprising at least one longitudinally extending slit defined in said first portion of the female part and at least one further slit which is defined in and extends over the length of said second portion, each slit of said first portion being axially aligned with a respective said further slit and connected to its respective further slit by an internal groove; and
    a male part having an end portion having an expander region adapted to be received in said through-passage, said expander region comprising a plurality of taper portions for expanding the female part when said male part is moved axially relative to the female part such that an opposite end portion thereof moves away from the female part whereby, the female part is securable in said recess, wherein said through-passage is provided with a mating region comprising a plurality of taper portions arranged to cooperate with said male part taper portions.

22. A device as claimed in claim 21, wherein said first end portion of said female part has a free end remote from said second portion and the or each said longitudinally extending slit defined in said first end portion extends from the respective said internal groove to a respective slit end which slit end is spaced apart from said free end.

23. A device as claimed in claim 21, wherein said rate of taper of at least one of said male part taper portions is linear.

24. A device as claimed in claim 21, wherein said expander region comprises two axially spaced apart taper portions which are separated by a further taper portion having a rate of taper different to the rate of taper of either of said two taper portions.

25. A device as claimed in claim 21, further comprising an adjusting means to be installed in another joint member in operative relationship with the male part and being adapted for adjustably pulling on the male part in use of the device to cause said axial relative movement between said male and female parts.

26. A device as claimed in claim 21, wherein said male part is axially push-fittable into said female part in one direction and comprises retention means so as to be retainable in said female part when push-fitted therein, said retention means comprising at least one projection arranged to grip against a shoulder of said female part and so as to be slidable in a respective said slit of said first portion and groove associated therewith during push-fitting of the male part.

27. A device for use in forming a joint, the device comprising a female part to be at least partially installed in a recess in one joint member, and a male part having an end portion having an expander region adapted to be received in said female part, said expander region comprising a plurality of taper portions for expanding the female part when said male part is moved axially relative to the female part such that an opposite end portion thereof moves away from the female part whereby, the female part is securable in said recess, said female part comprising a centrally disposed through-passage provided with a mating region comprising a plurality of taper portions arranged to cooperate with said male part taper portions, wherein said male part comprises retention means so as to be retainable in said female part when push-fitted therein.

28. A device as claimed in claim 27, wherein said male part is axially push-fittable into said female part in one direction and said retention means comprises at least one projection arranged to grip said female part so as to resist movement in the direction opposite said one direction.

29. A device as claimed in claim 27, wherein said retention means grips against a shoulder of said female part.

30. A device as claimed in claim 27, further comprising an adjusting means to be installed in another joint member in operative relationship with the male part and being adapted for adjustably pulling on the male part in use of the device to cause said axial relative movement between said male and female parts.

31. A device as claimed in claim 27, wherein said rate of taper of at least one of said male part taper portions is linear.

32. A device as claimed in claim 27, wherein said expander region comprises two axially spaced apart taper portions which are separated by a further taper portion having a rate of taper different to the rate of taper of either of said two taper portions.

33. A device as claimed in claim 27, wherein said female part comprises means for facilitating expansion thereof, said expansion facilitating means comprising at least one longitudinally extending slit.

34. A device as claimed in claim 33, wherein said female part has a leading end which, in use, is installed first in said recess and the or each slit has a first end which is spaced apart from said leading end and extends from said first end away from said leading end.

35. A device for use in forming a joint, the device comprising a female part to be at least partially installed in a recess in one joint member, and a male part having an end portion having an expander region adapted to be received in said female part, said expander region comprising a plurality of taper portions for expanding the female part when said male part is moved axially relative to the female part such that an opposite end portion thereof moves away from the female part whereby, the female part is securable in said recess, said female part comprising a centrally disposed through-passage provided with a mating region comprising a plurality of taper portions arranged to cooperate with said male part taper portions, wherein in semi-axial cross-section said expander region has a profile comprising a plurality of axially spaced apart tapers and said female part comprises a plurality of split ring means, each said split ring means defining a split, said split ring means being interconnected so as to be axially spaced apart and in substantially coaxial relationship with said splits being in axial alignment for allowing transverse insertion of said expander region.

36. A device as claimed in claim 35, further comprising an adjusting means to be installed in another joint member in operative relationship with the male part and being adapted for adjustably pulling on the male part in use of the device to cause said axial relative movement between said male and female parts.

37. A device as claimed in claim 35, wherein each of said male part taper portions has a major diameter and the major diameter of each said male part taper portion is substantially the same.

38. A device as claimed in claim 35, wherein the outside diameter of portions of said female part to be installed in said one joint member recess does not exceed about 5.5 mm.

39. A device for use in forming a joint, the device comprising a female part to be at least partially installed in a recess in one joint member, and a male part having an end portion having an expander region adapted to be received in said female part, said expander region comprising a plurality of taper portions for expanding the female part when said male part is moved axially relative to the female part such that an opposite end portion thereof moves away from the female part whereby, the female part is securable in said recess, said female part comprising a centrally to disposed through-passage provided with a mating region comprising a plurality of taper portions arranged to cooperate with said male part taper portions, wherein in semi-axial cross-section said expander region has a profile comprising a plurality of axially spaced apart tapers and the outside diameter of portions of said female part to be installed in said one joint member does not exceed about 5.5 mm.

40. A device as claimed in claim 39, further comprising an adjusting means to be installed in another joint member in operative relationship with the male part and being adapted for adjustably pulling on the male part in use of the device to cause said axial relative movement between said male and female parts.

41. A device as claimed in claim 39, wherein said female part comprises means for facilitating expansion thereof said expansion facilitating means comprising at least one longitudinally extending slot.

42. A device as claimed in claim 41, wherein said female part has a leading end which, in use, is installed first in said recess and the or each slit has a first end which is spaced apart from said leading end and extends from said first end away from said leading end.

43. A device as claimed in claim 39, wherein said male part taper portions are defined by respective adjacent turns of a continuous spiralling surface.

44. A device as claimed in claim 39, wherein each of said male part taper portions has a major diameter and the major diameter of each said male part taper portion is substantially the same.

45. A package of knock-down furniture components comprising two disassembled furniture parts, one of which is fitted with the joint forming device as claimed in any one of claims 1, 18, 21, 27, 35 and 39.

* * * * *